United States Patent
Dams et al.

(10) Patent No.: US 6,792,083 B2
(45) Date of Patent: Sep. 14, 2004

(54) METHOD AND DEVICE FOR ACTIVATING A VOICE-CONTROLLED FUNCTION IN A MULTI-STATION NETWORK THROUGH USING BOTH SPEAKER-DEPENDENT AND SPEAKER-INDEPENDENT SPEECH RECOGNITION

(75) Inventors: Franciscus J. L. Dams, Hilversum (NL); Piet B. Hesdahl, Hilversum (NL); Jeroen G. Van Velden, Hilversum (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/167,818

(22) Filed: Oct. 7, 1998

(65) Prior Publication Data

US 2003/0147510 A1 Aug. 7, 2003

(30) Foreign Application Priority Data

Oct. 7, 1997 (EP) .............................. 97203083

(51) Int. Cl.$^7$ ................................................ H04M 1/64
(52) U.S. Cl. ................................... 379/88.01; 704/246
(58) Field of Search ........................ 379/88.01, 142.01, 379/221.09, 88.02, 88.03, 88.04, 88.13; 704/241, 240, 253, 260, 231, 256

(56) References Cited

U.S. PATENT DOCUMENTS

| | | | | |
|---|---|---|---|---|
| 4,922,538 A | | 5/1990 | Tchorzewski | 381/42 |
| 5,073,939 A | * | 12/1991 | Vensko et al. | 704/241 |
| 5,091,947 A | * | 2/1992 | Ariyoshi et al. | 379/88.02 |
| 5,163,081 A | * | 11/1992 | Wycherley et al. | 379/88.01 |
| 5,165,095 A | | 11/1992 | Borcherding | 379/88 |
| 5,297,183 A | * | 3/1994 | Bareis et al. | 379/88.02 |
| 5,353,376 A | * | 10/1994 | Oh et al. | 379/88.01 |
| 5,384,833 A | * | 1/1995 | Cameron | 379/88.01 |
| 5,475,791 A | * | 12/1995 | Schalk et al. | 379/88.01 |
| 5,511,111 A | * | 4/1996 | Serbetcioglu et al. | 379/88.01 |
| 5,553,119 A | * | 9/1996 | McAllister et al. | 379/221.09 |
| 5,719,921 A | * | 2/1998 | Vysotsky et al. | 379/88.01 |
| 5,724,481 A | * | 3/1998 | Garberg et al. | 379/88.01 |
| 5,913,192 A | * | 6/1999 | Parthasarathy et al. | 704/256 |
| 6,076,054 A | * | 6/2000 | Vysotsky et al. | 704/240 |
| 6,088,669 A | * | 7/2000 | Maes | 704/231 |

FOREIGN PATENT DOCUMENTS

EP 0661690 A1 5/1995 ............. G01L/9/00

* cited by examiner

*Primary Examiner*—Fan Tsang
*Assistant Examiner*—Gerald Gauthier

(57) ABSTRACT

A voice-controlled multi-station network has both speaker-dependent and speaker-independent speech recognition. Conditionally to recognizing items of an applicable vocabulary, the network executes a particular function. The method receives a call from a particular origin and executes speaker-independent speech recognition on the call. In an improvement procedure, in case of successful determination of what has been said, a template associated to the recognized speech item is stored and assigned to the origin. Next, speaker-dependent recognition is applied if feasible, for speech received from the same origin, using one or more templates associated to that station. Further, a fallback procedure to speaker-independent recognition is maintained for any particular station in order to cater for failure of the speaker-dependent recognition, while allowing reverting to the improvement procedure.

10 Claims, 2 Drawing Sheets

METHOD AND DEVICE FOR ACTIVATING A VOICE-CONTROLLED FUNCTION IN A MULTI-STATION NETWORK THROUGH USING BOTH SPEAKER-DEPENDENT AND SPEAKER-INDEPENDENT SPEECH RECOGNITION

BACKGROUND OF THE INVENTION

The invention relates to a method as claimed in the preamble of claim 1. Pertinent art that combines both speaker-dependent and speaker-independent recognition facilities in a single system has been disclosed in U.S. Pat. No. 5,165,095. Here, speaker-independent recognition is used for terms and phrases that are considered common to many speakers such as various commands for effecting dialling and various other functions. Generally, the functions use the network, but need not be restricted to the network itself. Furthermore, speaker-dependent recognition is used to recognize private terms such as personal names and the like. Generally, speaker-independent recognition must access a larger template base to recognize a particular term, but even then is often less successful. Speaker-dependent recognition generally has fewer failures, so it would be preferable to be able to resort to speaker-dependent recognition in most cases. However, fur using speaker-dependent recognition, the system must identify the actual speaker. Further, user persons experience the training of the system as a tedious task.

SUMMARY TO THE INVENTION

In consequence, amongst other things it is an object of the present invention to allow the system to gradually and reversibly improve to speaker-dependent recognition if feasible. Now therefore, according to one of its aspects the invention is characterized according to the characterizing part of claim 1.

The invention also relates to a device arranged for executing the method according to the invention. Further advantageous aspects of the invention are recited in dependent claims.

BRIEF DESCRIPTION OF THE DRAWING

These and further aspects and advantages of the invention will be discussed more in detail hereinafter with reference to the disclosure of preferred embodiments, and in particular with reference to the appended Figures that show.

DETAILED DESCRIPTION OF PREFERRED EMBODIMENTS

Figure 1:
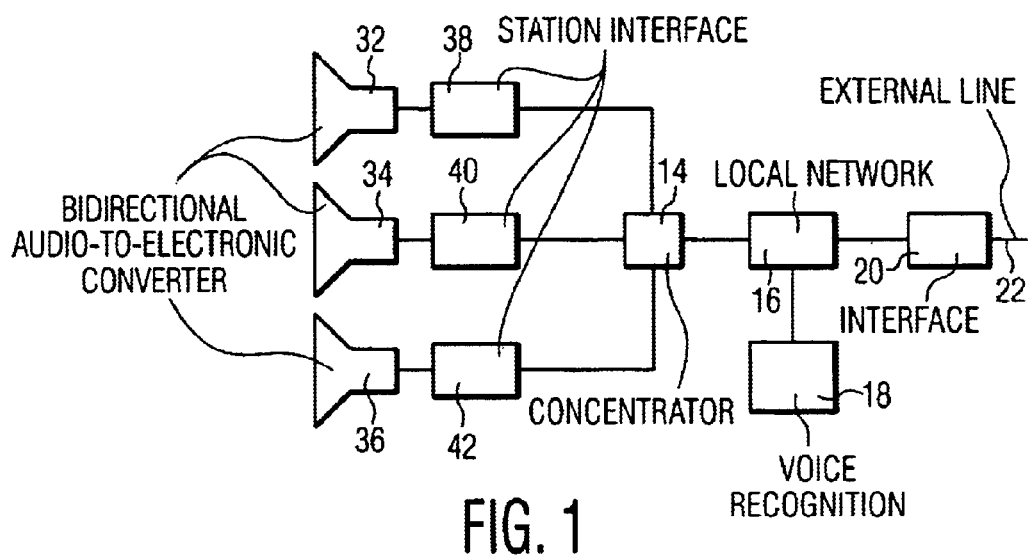
FIG. 1, a block diagram of an applicable network.

In modern telecommunication a key function is directory search using automatic speech recognition, and including the facility for fast introduction of new entries into the directory. No lengthy training is considered feasible.

The technique used here is whole word recognition of any entry, using sparse initial training and automatic additional training, using the CLI (Caller Line Identity) to identify the origin of the call. The approach is particularly advantageous for portable telephones. Alternatively, the caller may be recognized by executing speaker recognition through using the received speech itself, thereby allowing a user person to freely move between a plurality of stations. Other speech recognition techniques than whole word recognition are feasible, such as recognition on the level of phonemes or of diphones.

In word recognition each word must be trained with several examples. To recognize a particular speech item, a speaker-dependent system needs only a few examples or templates therefor from that speaker. A speaker-independent system requires many examples from many speakers. Typically some 100 speakers for each gender are required for a reliable speaker-independent system. Most known speaker-independent recognition systems use separate models for male and female speech. Using more speakers will improve the reliability still further.

To alleviate training requirements for a speaker-independent system, the invention uses an adaptive strategy. Initially the system is trained with only few examples, but during actual usage further examples are collected and used for automatic improvement. The aim is to ensure that a user is recognized at least the second time he enters a particular utterance into the system such utterance being based on the above speech items.

The criteria used for selecting a training method are user oriented. A distinction is made between initial performance, performance during upgrading, and eventual performance after long adaptation.

For the final performance a balance has been found between overall performance, and performance for each individual user taken separately. If only overall performance as solely measured on the total number of recognitions were optimized, the system will foremostly be trained on frequent users. This would result in a system that would serve only a group of such frequent users. However, the principal aim of a directory system is to replace a printed directory that is needed in particular for extension numbers that are used seldom. This is exactly the opposite of frequent users/usage.

A user will want the system to adapt quickly to faulty recognitions. If an utterance is not recognized at first use, as from the second time its chance of being recognized should improve considerably. This calls for a strategy wherein faulty recognitions are used to extend the body of templates.

The most general templates are acquired using a uniform distribution of the training data over the speakers. Contrariwise, using all recorded material for training will foremostly benefit frequent users.

Now, according to the invention, in an environment with a restricted user group, such as a medium size office, getting both optimal performance for each individual user, and also good performance over the whole directory for all users is best acquired if the speaker is known to the system (by Calling Line Identity or otherwise). Two types of templates are now used simultaneously: general templates and user specific templates.

The user-specific templates can be updated quickly, which will result in a good performance for the associated individual user. The drawback is that only utterances already used by a speaker are used for training to that particular user.

The general templates will give a reasonable overall performance directly, but to get enough samples for all entries will take much time. Training of these templates is done with lower priority.

The strategies used for training the user specific templates is:

No initial training and adaptation by cyclic retaining of N (typically in the order of 5) recordings for each item;

every use of such item is recorded. Cyclic retraining will continuously adapt the system.

The general templates will benefit most from a uniform distribution over all users. However, in the initial phase only few recordings are available, therefore the way to reach a uniform distribution must be specified. The easiest way to get an initial training base is to use one (or a few) speaker(s) per gender. In this way only a few persons will be bothered with the initial training.

The preferred approach is:

Initial training with one speaker per gender

Use all recordings, but maximally M such as five, per caller

Cyclic refreshing of M recordings per user person, resulting in continuous adaptation. Here M is the maximum capacity for training recordings divided by the maximum number of users.

The proposed approach necessitates for a set of parallel users an increase of the number of templates actually matched with 50% (one user specific template, plus a male and a female template). However, the overall performance will be much better than with a completely speaker-independent system. Over a period of time the system will evolve from a "one speaker"-dependent system, via a speaker-independent system, to eventually a combination of a speaker-dependent system for all frequent users with a speaker-independent system for novice or accidental users.

If occasionally the CLI is unknown and/or the speaker identity cannot be recognized otherwise, an extra default "user" may be introduced. The system will handle this default user as a frequent user. In advanced systems, however, an alternative strategy for adapting in the absence of a user identity can be chosen. Using all recordings for training will always result in over-representation of frequent user(s). Alternatively using only the failed recognitions will result in performance oscillation, but all users will be able to use the system. A balance between these two extremes has been chosen through evaluating the two strategies. The proposed scenario for adaption without CLI is:

Use each Kth good recognition, wherein K is about 5, and furthermore use all failed recognitions for updating the stored templates.

FIG. 1 is a block diagram of an applicable network. For this three station network, item 32 is a bidirectional audio-to-electronic converter. For the same station, block 38 is the station interface to the network. For the other two stations, item pairs 34/40 and 36/42 have corresponding functions. Block 14 has a concentrator function and connects the three respective stations to the local network. Block 16 operates as the local network manager. Block 18 houses the voice recognition facilities and the local telephone extension directory. Finally, block 20 interfaces the local network to an external network that is symbolized by line 22.

Figure 2:
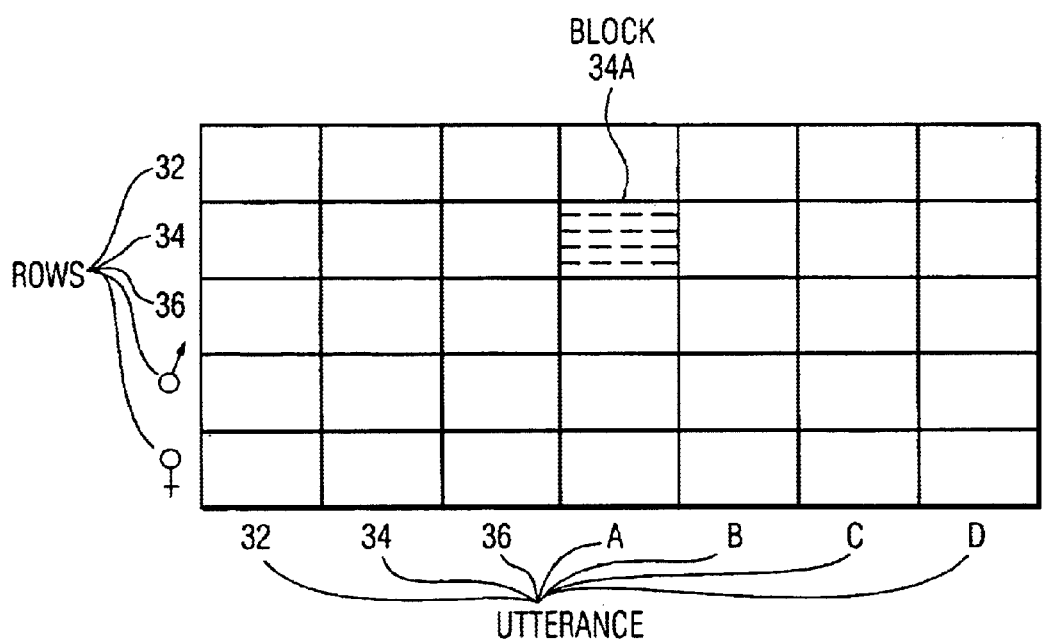
FIG. 2, an organization of the templates.

FIG. 2 shows an exemplary storage organization of the templates. The Figure contains a matrix of storage blocks. Rows 32, 34, and 36 correspond to the stations 32, 34, and 36 in FIG. 1, respectively. The final two rows correspond to the "male" and "female" general speakers, respectively. As shown, the system should recognize seven utterances, to wit, the three "names" associated to the respective stations, and four general commands A, B, C, D, such as "call", "terminate", and further as required. Each block, such as has been indicated in block 34A accommodates a plurality of templates, which for this particular block has been shown as five. The "general" blocks on the lower two rows have been shown as being of equal size as the others, but they may accommodate more templates if required.

The filling of the respective blocks has been indicated supra. First, the system is trained with one speaker for each gender, thereby wholly or partially filling the lower two rows. Next in practice, all further utterances will be used, but in each column at most M per caller; these are stored in the row of that caller. These templates will be cyclically refreshed. The recognition presumably knows the caller identity, and therefore takes into account the content of the associated row and furthermore, the content of the lowest two rows. The latter cater for speaker-independent recognition. Also for the speaker-independent templates on the lower two rows the training is continued.

Figure 3:
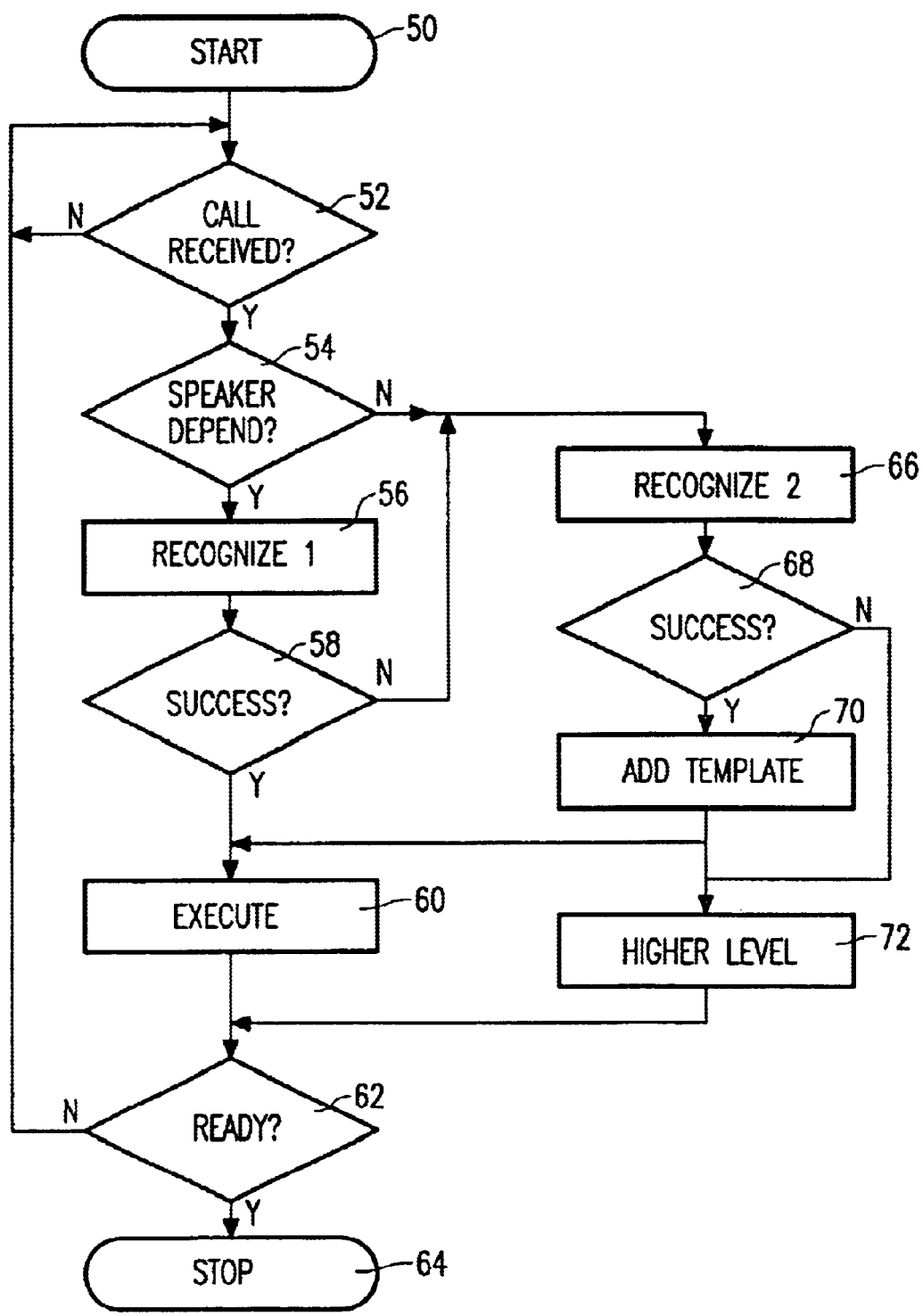
FIG. 3, a flow diagram of an applicable procedure.

FIG. 3 is a flow diagram of an applicable recognition procedure. Block 50 is the start block. This claims various necessary hardware and software facilities. In block 52 it is detected whether an actual call is received. If not, the same block is re-entered after a waiting loop of appropriate length. In block 54 it is detected whether for the station in question a sufficient amount of speaker-dependent templates is already present in the recognition facility. If positive, in block 56 the speaker-dependent recognition is undertaken. In block 58 it is detected whether the recognition process has led to a sufficient amount of success so that the function to be undertaken can effectively be activated. If, however, in block 54 the outcome was negative or alternatively in block 58 the speaker-dependent recognition has led to a failure, the system goes to block 66. Here speaker-independent recognition is undertaken. Next, in block 68 in similar manner to block 58 it is detected whether a sufficient amount of success has been attained. If the outcome is positive, the speech so recognized yields a template which in block 70 is added to the local template set associated to the calling station in question. The adding or replacing algorithm with respect to this template has been described supra. Subsequently, the recognized function is activated in block 60. If the recognition in block 68 has led to a failure in block 72, a higher level measure is taken such as asking the user person to repeat the question or command or requesting a non-speech entry. In block 62 it is detected whether the process has effectively been terminated. If negative, the system reverts to block 52, to further cycle through the described operations. If the system is ready, it is transferred to block 64 and the hardware and software facilities may be relinquished. Alternatively, the speaker-dependent and speaker-independent recognition procedures may be executed coexistently, the decision for success or otherwise then occurring at a correspondingly other location in the diagram.

The system may incorporate higher level measures for ascertaining whether or not recognition was correct, thereby externally defining an appropriate speech item. One is to provide an additional question to the user that must be answered by yes/no only. Another one is to build-in a check by key actuation, or to allow keying in of a particular phrase. This allows to automatically update the stored body of templates for so continually improving the performance of the system. In fact, the combination of an unrecognized speech item and the subsequent ascertaining of the meaning of the unrecognized speech item will combine to update the stored body of templates. The training with templates that correspond to immediately recognized speech items, on the basis of the speech itself, will cater for slow drifts in the manner the speech in question is actually produced.

What is claimed is:

1. A method for activating a voice-controlled function in a multi-station network by using both speaker-dependent and speaker-independent speech recognition facilities, and conditionally to recognizing one or more items or an applicable vocabulary, driving one or more network parts to activate said function, wherein said method comprises the following steps:

receiving a station-initiated call containing one or more initial speech items from the vocabulary, executing speaker-independent recognition on said initial speech items through one or more general templates, whilst in an speech recognition improvement procedure, in case of successful ascertainment of what had been actually spoken, storing a particular speaker-specific template derived from the initial speech item so recognized and assigned to an origin of the call in question, said speaker-specific template being cyclically retained for subsequent speaker-dependent recognition of additional speech items having the same origin;

following said speech recognition improvement procedure, applying speaker-dependent recognition as an initial type of speech recognition if feasible for additional speech items received from the same origin, through one or more particular templates associated to that origin and only subsequently applying speaker-independent recognition as a fallback procedure if the recognition of the additional speech items cannot be ascertained by speaker-dependent recognition, wherein speaker-independent recognition is a first response for new or unidentified users of the voice-controlled function, and speaker-dependent recognition based on said speech recognition improvement procedure is a first response for repeat users of the voice-controlled function, with a reversion to speaker-independent recognition if the additional speech items are not recognized.

2. The method as claimed in claim 1, wherein said origin is defined by a Calling Line Identity (CLI).

3. The method as claimed in claim 1, and providing for externally defining a speech item for which both speaker-dependent and speaker-independent recognition had been unsuccessful and/or erroneous, thereby effecting said ascertaining.

4. The method as claimed in claim 3, and allowing for then storing a particular template derived from the non-recognized speech item.

5. The method as claimed in claim 3, and allowing for then storing a general template derived from the non-recognized speech item.

6. The method as claimed in claim 1, wherein said function includes a directory search based on an identifier received in the form of speech.

7. The method as claimed in claim 1, wherein the vocabulary is predefined and finite.

8. The method as claimed in claim 1, and cyclically refreshing a set of templates originating from the same origin and representing the same speech item.

9. The method as claimed in claim 1, and treating an unidentified origin as a default origin additional to all registered origins.

10. A device being arranged for executing the method as claimed in claim 1.

* * * * *